United States Patent [19]

Hogan

[11] 3,995,795
[45] Dec. 7, 1976

[54] WIRING ANTI-CHAFE SUPPORT DEVICE
[75] Inventor: John Hogan, Cypress, Calif.
[73] Assignee: McDonnell Douglas Corporation, Long Beach, Calif.
[22] Filed: Mar. 24, 1975
[21] Appl. No.: 561,481
[52] U.S. Cl. ................... 248/68 R; 248/74 PB
[51] Int. Cl.² ........................ F16L 3/12
[58] Field of Search ........... 248/74 R, 74 B, 74 PB, 248/68 R, 54 R; 24/279, 286, 16 R, 16 PB, 73.5 A, 73.5 PB; 174/40 CC

[56] References Cited
UNITED STATES PATENTS

| 2,393,033 | 1/1946 | Ellinwood | 248/74 B X |
|---|---|---|---|
| 2,409,772 | 10/1946 | Lund | 248/74 B |
| 2,688,655 | 9/1954 | Gross | 248/74 R X |
| 2,904,294 | 9/1959 | Marygold | 248/74 PB |
| 2,977,145 | 3/1961 | Rifkin | 248/74 PB X |
| 3,176,504 | 4/1965 | Shapiro | 211/60 R X |
| 3,213,559 | 10/1965 | Matich | 24/16 PB X |
| 3,341,651 | 9/1967 | Odegaard | 248/74 PB X |
| 3,376,004 | 4/1968 | Goldman | 248/74 B |
| 3,564,676 | 2/1971 | Oeser | 248/74 R X |
| 3,684,223 | 8/1972 | Logsdon | 248/74 PB |

FOREIGN PATENTS OR APPLICATIONS

| 839,585 | 4/1952 | Germany | 248/68 R |
|---|---|---|---|
| 415,390 | 8/1934 | United Kingdom | 248/68 R |
| 898,124 | 6/1962 | United Kingdom | 24/73 PB |
| 722,084 | 1/1955 | United Kingdom | 248/68 R |
| 599,050 | 3/1948 | United Kingdom | 248/74 PB |

Primary Examiner—Roy D. Frazier
Assistant Examiner—Rodney H. Bonck
Attorney, Agent, or Firm—D. N. Jeu; Walter J. Jason; Donald L. Royer

[57] ABSTRACT

Improved clamp means for mounting and firmly securing wires and the like comprises a conventional loop clamp or wire restraint and an anti-chafe support device of a nodal structure to prevent abrasion and chafing of the mounted wires. The anti-chafe support device can be made of a resilient material in strip form having raised nodes on one side and a longitudinal channel or groove on the other side to accommodate the loop clamp or wire restraint. A formed strip of suitable length is coiled and installed on the loop clamp or wire restraint so that the nodes are radially directed inwardly to provide a large gripping area for wires positioned against or between them. The nodes not only greatly increases wire retention force by providing a much greater gripping area but can also provide definite separation of wires positioned between spaced nodes.

6 Claims, 12 Drawing Figures

WIRING ANTI-CHAFE SUPPORT DEVICE

BACKGROUND OF THE INVENTION

My present invention relates generally to clamp means such as loop clamps, wire restraints, etc. for mounting and restraining wires, pipes and the like. More particularly, the invention relates to an anti-chafe support device which can be used with a loop clamp, wire restraint, etc. to prevent abrasion and chafing of wiring or piping mounted therein.

Conventional loop clamps having a smooth resilient lining extending around the clamp loop are commonly used to mount and restrain a plurality of wires or pipes therein. The smooth resilient lining is also frequently used around a bundle of wires or pipes gripped by the curved jaws of a wire restraint to provide a cushion between the bundle and the gripping jaws. The smooth resilient lining of a loop clamp or wire restraint, however, has only point contact on the surfaces of the outer wires or pipes of the bundle. Thus, the bundle and its wires or pipes are not firmly secured and can rotate or work loose to cause possible damage or difficulty.

SUMMARY OF THE INVENTION

Briefly, and in general terms, my invention is preferably accomplished by providing an improved clamp means or wire restraint including an anti-chafe support device of a nodal structure to secure wires or pipes firmly in the clamp means or wire restraint and prevent abrasion or chafing of such wires or pipes. The anti-chafe support device is preferably made of a resilient material in strip form having raised nodes on one side and a channel or groove on the other side to accommodate a conventional loop clamp or wire restraint. A formed strip of suitable length is normally coiled and installed on the loop clamp or wire restraint so that the nodes are radially directed inwardly to provide separation and a greatly increased contact or gripping area for the wires or pipes mounted and retained in the clamp means or wire restraint.

In a first embodiment of the anti-chafe support device according to this invention, a strip of resilient material has uniform raised nodes of a gearlike teeth configuration on one side and a channel or groove defined by longitudinal side walls with right angular cover flaps on the other side. In a second embodiment of the device, the uniform gearlike nodes can be longitudinally spaced regularly at different pitch spacings for different (size) retention applications and the angular cover flaps are preferably deleted. In a third embodiment of the anti-chafe support device, the raised nodes are configured and longitudinally spaced on one side so that when the device is installed coiled in a loop clamp, for example, nearly cylindrical passageways are formed by the device and its nodes to retain and separate larger cables or pipes respectively in such passageways. The channel or groove on the other side of the third embodiment of the device can be similar to that in either the first or second embodiment thereof.

A novelty search on the present invention produced U.S. Pat. No. 3,161,210 of Nils O. T. Loof for Plastic Strips patented Dec. 15, 1964 and U.S. Pat. No. 3,213,559 of Donald Matich for Loading Device For Revolvers patented Oct. 26, 1965. In the Loof patent, axially longitudinal ribs with separating grooves are provided partially on the inner surface of an annular strip of resilient plastic material and partially on the outer surface thereof so that the strip may be wrapped around a pipe and the ribs near one longitudinal edge of the strip snapped into engagement with the grooves near to the other longitudinal edge thereof.

In the Matich patent, a flexible plastic belt is formed with a plurality of longitudinally spaced transverse divider walls having hollow end ribs extending from one side of the belt. When the belt is rolled up with the adjacent ribs touching at the center, the spaces between adjacent walls form circular recesses which hold the cartridges that are to be loaded into a revolver. The ribs are hollow to facilitate their deformation and squeezing between adjacent cartridges as the belt is unloaded. The cartridges are released from the belt by releasing the holding means on the belt, and pulling the belt and walls away from the cartridges so they are free to drop into the revolver cylinders. Clearly, the Loof and Matich inventions are fully different from the present invention.

BRIEF DESCRIPTION OF THE DRAWINGS

My invention will be more fully understood, and other advantages and features thereof will become apparent, from the following description of certain exemplary embodiments of the invention. The description is to be taken in conjunction with the accompanying drawings, in which.

DESCRIPTION OF THE PRESENT EMBODIMENTS

In the following description and accompanying drawings of certain exemplary embodiments of my invention, some specific dimensions and types of materials are disclosed. It is to be understood, of course, that such dimensions and types of materials are given as examples only and are not intended to limit the scope of this invention in any manner.

Figure 1:
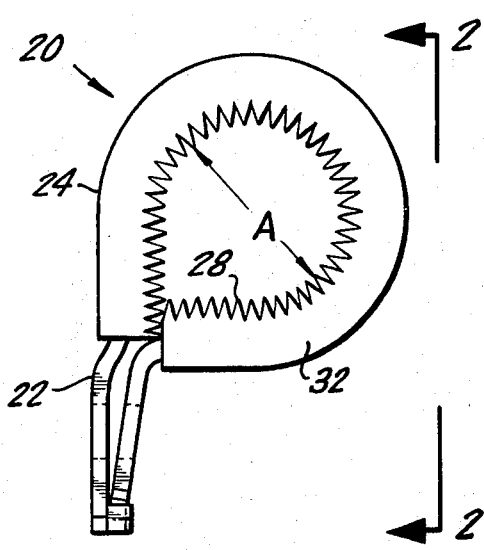
FIG. 1 is an elevational view of an improved clamp means including a conventional loop clamp and a first embodiment of an anti-chafe support device according to this invention.

FIG. 1 is an elevational view of an improved latch-type clamp means 20 including a conventional loop-type snap clamp 22 and a first embodiment according to this invention of a nodal anti-chafe support device 24 installed on the loop or snap clamp. The snap clamp 22 can be similar to that shown, described and claimed in U.S. Pat. No. 3,376,004 of Israel Goldman patented Apr. 2, 1968 for Snap Clamp, for example. The usual smooth resilient lining which extends around the clamp loop and the roof-shaped filler block of a triangular cross section are, however, replaced by the nodal anti-chafe support device 24. This results in the latch-type clamp means 20 having greatly improved and increased gripping and retention properties of wiring or piping secured and supported by the clamp means. The ends of the support device 24 firmly engage each other as illustrated when the snap clamp 22 is closed so that a roof-shaped filler block is not needed at the corner of the snap clamp to provide support for wires there and to prevent any wires from slipping therethrough. The clamp means 20 has an inner diameter A as indicated.

Figure 2:
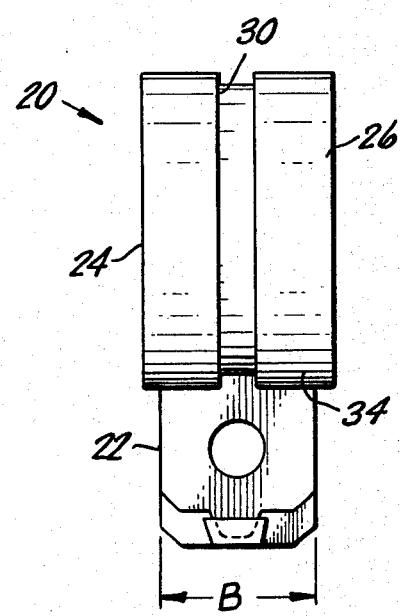
FIG. 2 is an elevational view of the improved clamp means as taken along the line 2—2 indicated in FIG. 1.

FIG. 2 is an elevational view of the latch-type clamp means 20 as taken along the line 2—2 indicated in FIG. 1. The anti-chafe support device 24 is preferably made of a resilient material in the form of a strip 26 having raised nodes 28 on one side and a channel or groove 30 on the other side to accommodate the snap clamp 22. The nodes 28 can be protuberances of various shapes and sizes. In this embodiment, the nodes 28 are preferably a multiplicity of serrations of uniformly sized and longitudinally spaced transverse teeth. This will allow the clamped wiring or piping to nest between the nodes 28 for separation and support. The channel or groove 30 on the other side of the anti-chafe support device 24 is preferably defined in this instance largely by longitudinal side walls 32 and cover flaps 34. The anti-chafe support device 24 can thus be firmly attached to the snap clamp 22 positioned in the channel or groove 30. The clamp 22 has a lateral dimension or width B as indicated.

Figure 3:
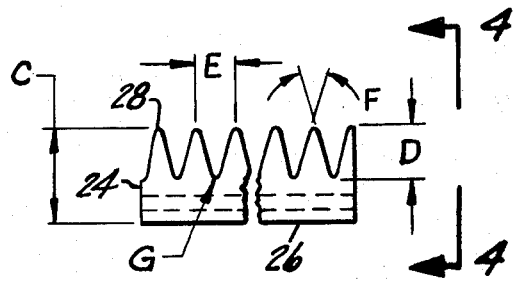
FIG. 3 is an enlarged, fragmentary, elevational view of the first embodiment of the anti-chafe support device.

FIG. 3 is an enlarged, fragmentary, elevational view of the anti-chafe support device 24 illustrating the details thereof. As can be seen, the nodes 28 are gearlike teeth of a generally sinusoidal configuration in this embodiment. The device 24 has an overall height C, and its nodes 28 have a root to crest dimension or height D. The nodes 28 have a pitch E, an angle F, and a radius G. The pitch E and angle F of the nodes 28 are preferably chosen to accommodate the normally smallest size wire or pipe to be included and secured within the latch-type clamp 20. Larger sizes of wires or pipes can still be firmly gripped and retained by the clamp means 20 with its anti-chafe support device.

It is noted that the greatest advantage of the anti-chafe support device 24 is that it not only provides separation of the wires or pipes, but it significantly increases the retention force on the wires or pipes by providing a 90% better and larger gripping area over the currently used clamps. The usual smooth resilient cushion or lining used on the current clamps has only point contact on the surfaces of the outer wires or pipes.

Figure 4:
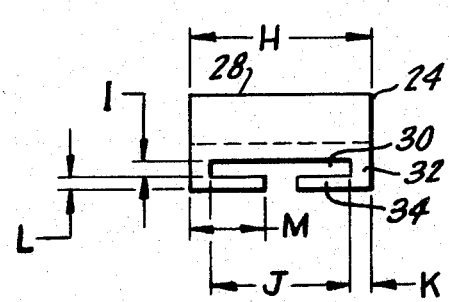
FIG. 4 is an elevational view of the first embodiment of the anti-chafe support device as taken along the line 4—4 indicated in FIG. 3.

FIG. 4 is an elevational view of the anti-chafe support device 24 as taken along the line 4—4 indicated in FIG. 3. The device 24 has an overall width H, channel or groove 30 height I and width J, side wall 32 thickness K, and cover flap 34 thickness L and width M. The longitudinal channel or groove 30 of the device 24 accommodates the snap clamp 22, and the side walls 32 and cover flaps 34 position and secure the device to the snap clamp as shown in FIGS. 1 and 2. The device 24 is preferably manufactured as a molded strip 26 which can be cut to suitable lengths for installation on snap clamps 22 of various selected diametrical sizes.

Figure 5:
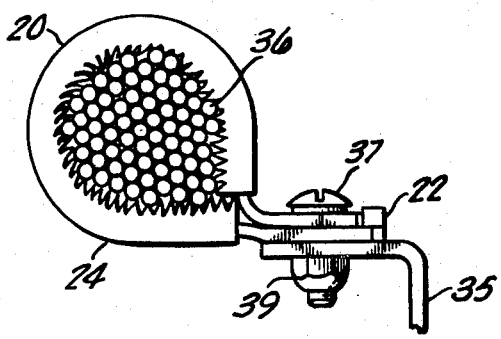
FIG. 5 is a fragmentary elevational view of the clamp means of FIGS. 1 and 2 attached to fixed structure, and mounting and securing a plurality of wires in the clamp means.

FIG. 5 is a fragmentary elevational view of the latch-type clamp means 20 attached to fixed structure 35 by a screw 37 and nut 39, and mounting and securing a plurality of wires 36. While the wires 36 are shown to be of uniform size, the wires obviously can be of different sizes. Note that the flat portion at one end of the support device 24 firmly abuts against and overlaps at least one or two nodes 28 at the other end to block out the corner of the snap clamp 22 and provide full support for all of the wires 36. Illustratively, the anti-chafe support device 24 can be made of silicone rubber and diameter A (FIG. 1) can be in the range from 0.250 inch to 4.125 inches, for example. For a snap clamp 22 width B (FIG. 2) of 0.500 inch, the device 24 can have the following dimensions (FIGS. 3 and 4) throughout the range of diameter A noted above: C = 0.312 inch, D = 0.15 inch, E = 0.12 inch, F = 37°, G = 0.010 inch radius, H = 0.620 to 0.630 inch, I = 0.06 inch maximum, J = 0.500 to 0.510 inch, K = 0.06 inch, L = 0.050 to 0.060 inch, and M = 0.25 inch minimum, for example. Generally, the angle F in this instance can be satisfactory when in the range from 30° to 45°, approximately.

Figure 6:
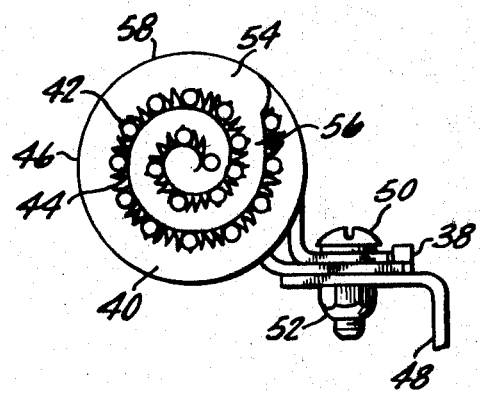
FIG. 6 is a fragmentary elevational view of another improved clamp means attached to fixed structure and mounting a plurality of wires, the clamp means including a conventional loop clamp and a second embodiment of the anti-chafe support device.

FIG. 6 is a fragmentary elevational view of a conventional loop-type snap clamp 38 and a second embodiment according to this invention of an anti-chafe support device 40 installed in the loop or snap clamp. In this instance, wires (or pipes) 42 can be spaced apart and laid between the nodes 44 of the device 40 which is then rolled into a spiral configuration 46 that can be clamped by the snap clamp 38 and attached to structure 48 by a screw 50 and nut 52. To form a reasonably round outer cylindrical surface for the snap clamp 38, the longitudinal side walls 54 of the device 40 can be deleted from or reduced on the inner coils or turns 56 of the spiral 46. Thus, if desired or required, the longitudinal side walls 54 can be provided only on the outer coil or turn 58 of the device 40.

Figure 7:
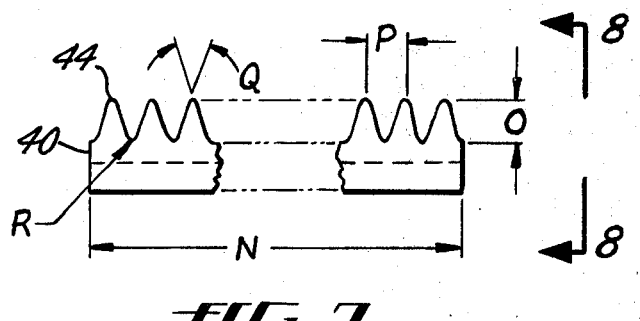
FIG. 7 is an enlarged, fragmentary, elevational view of the second embodiment of the anti-chafe support device.

FIG. 7 is an enlarged, fragmentary, elevational view of the anti-chafe support device 40 illustrating the details thereof. As can be seen, the nodes 44 are gearlike teeth of a generally sinusoidal configuration similar to the nodes 28 of FIG. 3. The device 40 has a length N, and its nodes 44 have a root to crest dimension or height O. The nodes 44 have a pitch P, angle Q, and a radius R. The length N of the device 40 is preferably given in practice only to 1/16 inch increments since greater accuracy is normally unnecessary. The length N and pitch P can have different values as required for device 40 having fixed values of its height O and radius R.

Figure 8:
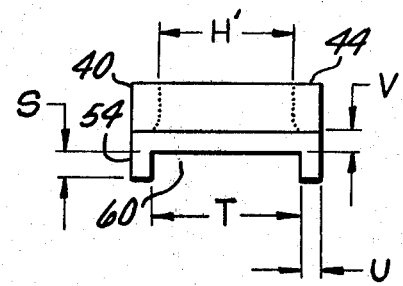
FIG. 8 is an elevational view of the second embodiment of the anti-chafe support device as taken along the line 8—8 indicated in FIG. 7.

FIG. 8 is an elevational view of the anti-chafe support device 40 as taken along the line 8—8 indicated in FIG. 7. The device 40 has a channel or groove 60 of height S and width T, side wall 54 thickness U, and root to channel or groove dimension V. The width T can have different values as required for device 40 having fixed values of its height S, thickness U, and dimension V. Thus, for fixed values of O = 0.15 inch, R = 0.010 inch, S = 0.060 to 0.090 inch, U = 0.060 to 0.090 inch and V = 0.090 inch, pitch P can have different values of 0.06 inch, 0.12 inch, 0.18 inch and 0.25 inch (angle Q of 14°, 37°, 56°, and 75°) corresponding respectively to the different values of channel or groove width T of 0.25 inch, 0.37 inch, 0.50 inch and 0.62 inch, for example. The pitch P is generally increased with increase of width of the snap clamp 38. The range of angle Q can be normally from 12° to 77°, approximately. Of course, the length L can be of any necessary length such as, for example, 3 inches. In an alternate or modified embodiment of the device 40, the width of the nodes 44 is reduced to a width H' as indicated by the dotted lines (which are differentiated from the usual dash lines for invisible edges) in FIG. 8. The nodes 44 width H' is preferably slightly less than the channel or groove 60 width T. This allows the nodes 44 to mate with and nest into the channel or groove 60 when the device 40 is rolled into the spiral configuration 46 shown in FIG. 6. Separation of the wires (or pipes) 42 is thus assured. Of course, the side walls 54 are not deleted from or reduced on the inner coils or turns 56 of the spiral 46 in this modified embodiment.

Figure 9:
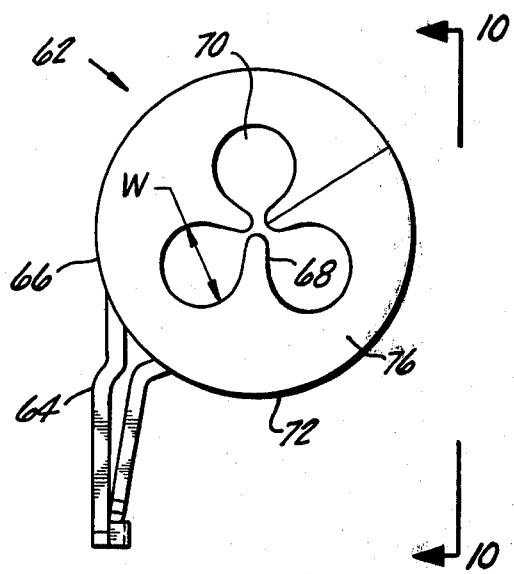
FIG. 9 is an elevational view of yet another improved clamp means including a conventional loop clamp and a third embodiment of the anti-chafe support device.

FIG. 9 is an elevational view of an improved latch-type clamp means 62 including a conventional loop-type snap clamp 64 and a third embodiment according to this invention of an anti-chafe support device 66 installed on the loop or snap clamp. The device 66 has nodes 68 which are suitably shaped and spaced to form nearly cylindrical passageways 70 when the device is coiled and installed on the snap clamp 64. The passageways 70 have a diameter W as indicated. The latch-type clamp means 62 with its device 66 is, of course, preferably used to mount and restrain larger sizes of cables, pipes, hoses, etc.

Figure 10:
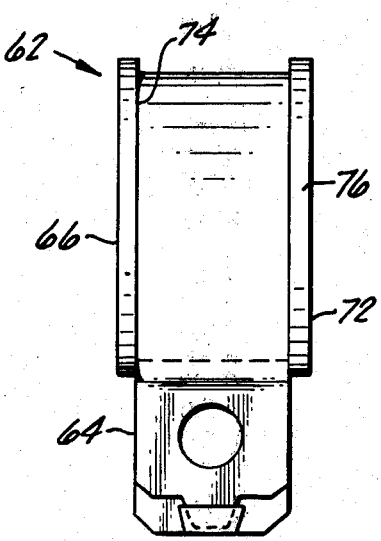
FIG. 10 is an elevational view of the improved clamp means as taken along the line 10—10 indicated in FIG. 9.

FIG. 10 is an elevational view of the latch-type clamp means 62 as taken along the line 10—10 indicated in FIG. 9. The anti-chafe support device 66 is preferably made (molded) in the form of a strip 72 of resilient material having the raised nodes 68 on one side and a channel or groove 74 on the other side to accommodate the snap clamp 64. The channel or groove 74 is formed by side walls 76 on the device 66. It can be seen from FIG. 9 that the device 66 and its nodes 68 conform to the cylindrical shape of larger cables, pipes, hoses, etc. to provide separation and prevent rotation thereof. The number of passageways 70 can be increased by increasing the number of nodes 68 and decreasing the spacing therebetween. Of course, the root to crest dimension or height of the nodes 68 can be suitably varied so that adequately curved passageways 70 are properly formed when the strip 72 is coiled and installed in the snap clamp 62.

Figure 11:
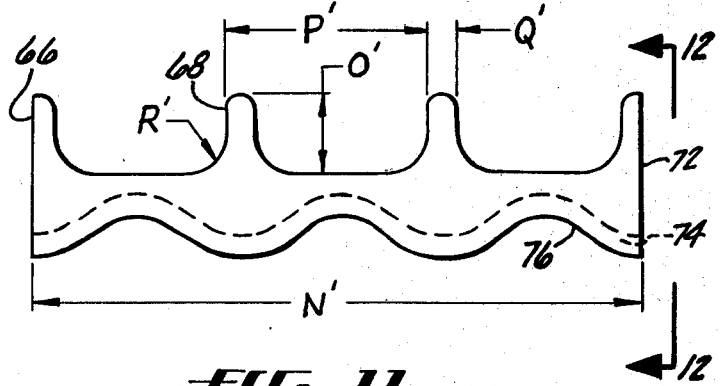
FIG. 11 is an elevational view of the third embodiment of the anti-chafe support device.

FIG. 11 is an elevational view of the anti-chafe support device 66 illustrating the details thereof. As can be seen, the nodes 68 of the strip 72 have a root to crest dimension or height O', a pitch P', longitudinal upper thickness Q' with a full radius crest, and a broad lower base of radius R'. The radius R' can, of course, be directly related to the diameter W (FIG. 9) of the passageways 70. Similarly, the length N' of the strip 72 is preferably related to the number of passageways 70 required. That is, the length N' can be proportional to the diameter W of the passageways 70 multiplied by the number of passageways required. Thus, the pitch P', height O', and radius R' of the nodes 68 normally are variably dependent upon and related to the diameter W of the passageways 70 and the number thereof required.

If a longer strip 72 with, for example, twice as many nodes 68 is installed on a larger loop snap clamp 64 (FIG. 9), six passageways 70 instead of three would be formed. These six passageways 70, however, would be open wider at the adjacent free ends of the nodes 68 and there would also be a greater central unoccupied area about the axis of the larger loop of the snap clamp 64. In this instance, the axial central area of the snap clamp 64 is preferably used to accommodate a suitably sized cable or bundle of smaller wires so that the snap clamp can have a relatively solid core on which to be clamped and tightened. It is noted that the longitudinally undulating channel or groove 74 (FIG. 11) is curved so that it conforms to a cylindrical shape such as the loop of snap clamp 64 (FIG. 9) when installed therein. Of course, the channel or groove 74 (and side walls 76) can be curved to form, when coiled, shapes other than a circular cylinder. Such other shapes could include elliptical, square or triangular cylinders, for example.

Figure 12:
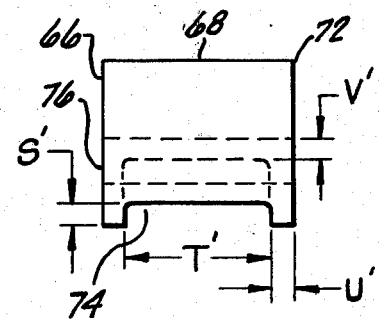
FIG. 12 is an elevational view of the third embodiment of the anti-chafe support device as taken along the line 12—12 indicated in FIG. 11.

FIG. 12 is an elevational view of the anti-chafe support device 66 as taken along the line 12—12 indicated in FIG. 11. The device 66 has a channel or groove 74 height S' and width T', side wall 76 thickness U', and root to channel or groove dimension V'. The strip 72 can have fixed values of Q' = 0.125 inch, S' = 0.060 inch, T' = 0.500 to 0.510 inch, U' = 0.060 inch, and V' = 0.090 inch, for example. It is noted that the ends of the strip 72 abut as shown in FIG. 9 to form a node 68. It is, of course, possible to have the ends of the strip 72 abutting halfway between two nodes 68 so that a node need not be formed from two halves of a node.

The anti-chafe support device embodiments 40 (FIGS. 7 and 8) and 66 (FIGS. 11 and 12) can also be used with wire restraint clamps for separation and support of wiring (or piping) therein. As is well known, the usual restraint clamp is somewhat similar to a vise clamp including two shallow U-shaped jaws opposingly closed by screws engaging their ends to grip a bundle of wires between the curved jaws. The clamp can be attached to fixed structure by a pair of arms wherein one end is threadedly engaged with (and midway on) the jaw screws and the other end is secured to the fixed structure. The anti-chafe support device 40 or 66 is suitably wrapped around the wires or pipes and the shallowly curved jaws of the clamp are accommodated by the channel or groove 60 or 74. The anti-chafe support device 40 can also be used with electrical connector "back shells" to prevent rotation and loosening of wires therein.

While certain exemplary embodiments of this invention have been described above and shown in the accompanying drawings, it is to be understood that such embodiments are merely illustrative of, and not restrictive on, the broad invention and that I do not desire to be limited in my invention to the details of construction or arrangements described and shown, for various modifications may occur to persons having ordinary skill in the art.

I claim:

1. A clamp means and anti-chafe support device combination comprising:
   clamp means including at least generally opposing loop portions; and an anti-chafe support device including a strip of resilient material of predetermined length, a plurality of raised nodes on a first side of said strip, and predetermined structure on a second side of said strip to accommodate said at least generally opposing loop portions of said clamp means, said strip having rodlike elements laid between said nodes and spaced along said length of said strip, and said strip being rolled in a generally spiral configuration which is clamped by said at least generally opposing loop portions of said clamp means, said nodes being of a gearlike configuration extending transversely to said length of said strip and said rodlike elements being normally positioned longitudinally parallel to said gearlike teeth nodes, and said structure on said second strip side comprising longitudinal side walls defining a channel of sufficient width to accommodate said at least generally opposing loop portions of said clamp means.

2. The invention as defined in claim 1 wherein said longitudinal side walls are at least reduced in height on the inner coils of said spirally rolled strip.

3. A clamp means and anti-chafe support device combination comprising:

clamp means including at least generally opposing loop portions; and an anti-chafe support device including a strip of resilient material of predetermined length, a plurality of raised nodes on a first side of said strip, and predetermined structure on a second side of said strip to accommodate said at least generally opposing loop portions of said clamp means, said strip having rodlike elements laid between said nodes and spaced along said length of said strip, and said strip being rolled in a generally spiral configuration which is clamped by said at least generally opposing loop portions of said clamp means, said nodes being of a gearlike configuration extending transversely to said length of said strip and said rodlike elements being normally positioned longitudinally parallel to said gearlike teeth nodes, and said structure on said second strip side comprising longitudinal side walls defining a channel to accommodate said clamp means at an outer coil of said spirally rolled strip, and said gearlike teeth nodes having a width at least slightly less than that of said channel and can mate therewith at an inner coil of said spirally rolled strip.

4. The invention as defined in claim 3 wherein said gearlike teeth nodes have an apex angle in the range from 30° to 45°, approximately, for a predetermined root to crest height of said gearlike teeth nodes.

5. A clamp means and anti-chafe support device combination comprising:

clamp means including a loop clamp; and an anti-chafe support device including a strip of resilient material of predetermined length, a plurality of raised nodes on a first side of said strip, and predetermined structure on a second side of said strip to accommodate said loop clamp, said strip being normally coiled and installed on said loop clamp with said nodes radially directed inwardly to provide a large gripping area for at least one rodlike element positioned against them and extending through said loop clamp, and a portion of one end of said strip engaging at least one node at the other end to close off said strip fully when said loop clamp is closed, said nodes being gearlike teeth of a generally sinusoidal configuration and extending transversely to said length of said strip whereby said at least one rodlike element can be normally constrained longitudinally parallel to said gearlike teeth nodes, and said gearlike teeth nodes having rounded crests and root junctions and an apex angle in the range from 30 to 45 degrees, approximately, for a predetermined root to crest height of said gearlike teeth nodes, said structure on said second strip side comprising longitudinal side walls defining a channel to accommodate said loop clamp, the loop portion of said loop clamp being accommodated in said channel and retained therein by said longitudinal side walls, and said gearlike teeth nodes having a width at least slightly less than that of said channel.

6. For use with a clamp means, an anti-chafe support device comprising:

a strip of resilient material of predetermined length and including a plurality of raised nodes on a first side of said strip, and a predetermined structure on a second side of said strip to accommodate said clamp means, said strip being normally coiled and installed on said clamp means with said nodes radially directed inwardly to provide a large gripping area for at least one rodlike element positioned against them and extending through said clamp means;

said nodes being gearlike teeth of a generally sinusoidal configuration and extending transversely to said length of said strip whereby said at least one rodlike element can be normally constrained longitudinally parallel to said gearlike teeth nodes; and said gearlike teeth nodes having rounded crests and root junctions and an apex angle in the range from 30° to 45°, approximately, for a predetermined root to crest height of said gearlike teeth nodes, and said structure on said second strip side comprising longitudinal side walls defining a channel having a width sufficient to accommodate said gearlike teeth nodes as well as said clamp means whereby said strip can be coiled more than once in said clamp means when required with said nodes nested within said channel at inner coils of said coiled strip.

* * * * *